Feb. 10, 1959 M. C. KIDD 2,873,387

CONTROLLABLE TRANSISTOR CLIPPING CIRCUIT

Filed Dec. 17, 1956

INVENTOR.
MARSHALL C. KIDD

BY

ATTORNEY 2,873,387
Patented Feb. 10, 1959

2,873,387

CONTROLLABLE TRANSISTOR CLIPPING CIRCUIT

Marshall C. Kidd, Haddon Heights, N. J., assignor to Radio Corporation of America, a corporation of Delaware Application December 17, 1956, Serial No. 628,807

5 Claims. (Cl. 307—88.5)

This invention relates to signal translating circuits and more particularly to transistor circuits for limiting or clipping a translated signal.

In many types of electronic equipment, such as television, radar, computer and like equipment, it may be necessary to limit or double clip electrical signals that are being translated for the purpose of time or amplitude selection. It may also be desirable to control, manually or automatically, the clipping or limiting levels of the signal without the use of complicated and expensive circuitry.

It is therefore an object of this invention to provide an improved signal limiter or clipper circuit utilizing transistors.

It is another object of this invention to provide an improved transistor signal limiter or clipper circuit in which the clipping or limiting levels may be controlled.

In accordance with the invention, an impedance element is connected in series with the signal translating circuit to which the signal to be clipped is applied and a transistor device is shunted across the circuit and connected with operating control means whereby the amplitude of signal excursions in one direction are limited by collector-to-base conduction of the transistor device and in the other direction by saturation of the collector-to-emitter current of the transistor.

Figure 1:
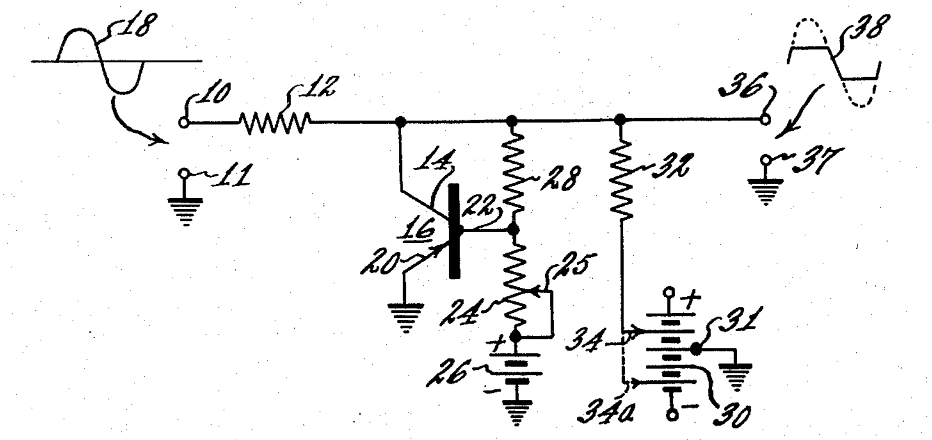
Figure 2:
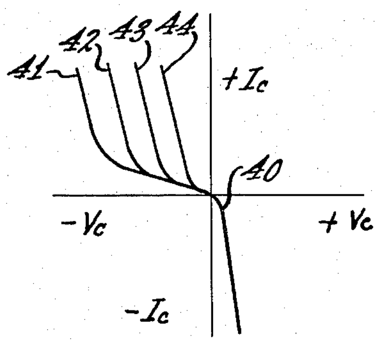

However, the invention may be better understood when the following description is read with reference to the accompanying drawings, in which:

Figure 1 is a schematic circuit diagram of a controllable transistor limiter or clipper circuit in acccordance with the invention; and, Figure 2 is a graph showing curves illustrating certain operational features of the circuit of Figure 1.

Referring now to the drawing and in particular to Figure 1, an input signal to be processed is applied between an input terminal 10 which is connected through a resistor 12 to the collector electrode 14 of a transistor 16, here illustrated as an N-type or PNP junction transistor, and a common or ground terminal 11 connected to a point of reference potential for the circuit. The signal applied to the input terminal 10 may be of any waveform desired, such as a square wave, triangular wave, sawtooth wave, or sine wave. However, for purposes of illustration a sine wave is indicated as being applied to the input terminal 10 and is illustrated in Figure 1 by the waveform 18. The emitter electrode 20 of the transistor 16 is connected directly to ground, and the base electrode 22 is connected through a variable resistor or potentiometer 24 to a source of energizing potential, here illustrated as a battery 26, having its negative terminal connected to ground. A variable tap 25 on the potentiometer is connected to adjust its resistance value.

The base electrode 22 is also connected to the collector electrode 14 through a feedback resistor 28, the purpose of which will be more fully explained hereinafter, and the collector electrode 14 is connected to a variable tap 34 on a second source of energizing potential, here illustrated as a battery 30, through a load resistor 32. The battery 30 has a ground tap 31 at an intermediate point thereon, and the variable tap 34 allows the energizing potential supplied to the collector electrode 14 to be varied from a positive to a negative value. Output signals are derived between an output terminal 36, which is connected directly to the collector electrode 14 of the transistor 16, and a ground terminal 37. One type of clipped or limited output signal that is available at the output terminals 36 is illustrated by the waveform 38, and the manner in which it is derived is hereinafter described.

In order to describe the operation of the circuit, assume that the variable tap 34 on the battery 30 is set so that a small positive voltage, negative, however, with respect to base electrode voltage, appears on the collector electrode 14, and that a sine wave is applied to the input terminal 10, as illustrated by the waveform 18. The collector-to-base diode of the transistor 16 will thus be biased in the reverse direction and initially offer a high impedance to the signal. Also, since the base electrode is biased positive with respect to the emitter electrode 20 and the transistor 16 is illustrated as a PNP transistor, no transistor action will take place. However, as the signal goes positive to a value equal to that provided by the battery 30 on the collector electrode 14, the collector-to-base diode will become forward biased and a low impedance to the signal to ground is presented through the impedance between the base electrode 22 and ground, which includes the resistor 24 and the battery 26. The signal will be divided by the resistor 12, in series with the path of the signal being translated, and the resistance of the collector to base junction and the base electrode impedance, in shunt with the signal path. The amount of attenuation will be determined by the relative impedance values of the series and shunt paths. Since the collector-to-base diode resistance and the resistor 25 may be made small compared to the impedance of the resistor 12, the attenuation may be made quite large. Thus as the input signal goes positive, the output signal available at the output terminal 36 has its upper portion clipped or limited as indicated by the waveform 38.

As the signal begins to go negative on the other half cycle, a high shunt impedance will be presented because no transistor action will occur when the collector electrode is biased negatively with a positive bias voltage present on the base electrode 22. Referring to Figure 2, as the voltage on the collector 14 continues to increase in a negative direction, the action will be described by the curves shown, which is a plot of the voltage on the collector 14 ($V_c$) versus the collector current of the transistor ($I_c$). Curve 40 illustrates the voltage-current characteristics. The downward sloping portion of the curve 40 in the lower right hand quadrant of the graph illustrates the collector-to-base diode characteristics, while the various portions 41, 42, 43, and 44 of the curve 40 in the upper left hand quadrant indicate the characteristics when transistor action is occurring. Thus, it will be seen that as the collector voltage ($V_c$) goes negative the current ($I_c$) increases nearly linearly therewith until one of the conditions indicated by the portions 41, 42, 43, or 44 is reached, at which time the voltage will not increase in the same proportion as the current increases. The particular portion 41, 42, 43, or 44 of the curve 40 at which the transistor operates is selected by varying the variable tap 25 on the base resistor 24. Thus, as the input signal goes negative, a negative going output signal will be available at the output terminal 36 with respect to ground and the terminal 37, as indicated by the central portion of the waveform 38 in Figure 1, until the selected curve portions 41, 42, 43, or 44 of Figure 2 are reached at which time a continued increase in the negative direction of the input signal will not produce a corresponding increase in the output signal, since the voltage will not change across the transistor 16 by any substantial amount, and the negative half of the input signal will thus be limited.

When transistor action is occurring as the collector electrode 14 is driven in a negative direction, the output impedance will increase. In order to lower the output impedance during the portion of the cycle of the signal when the collector electrode is negative, a feedback resistor 28 is connected between the collector electrode 14 and the base electrode 22. This feedback through this connection effectively lowers the output impedance during transistor action to make it substantially the same as the output impedance of the clipping circuit during other conducting portions of the cycle.

If a different voltage is selected to apply to the collector electrode by moving the tap 34 on the battery 30, the value at which the positive going portions of the signal wave is clipped may be varied. Thus, positioning the tap 34 to a more positive voltage will clip the signal wave at a more positive value, and positioning the tap 34 as at 34*a* to apply a negative voltage to the collector, will clip the wave at a negative voltage. As previously mentioned, variation in the position of the tap 25 on the base resistor 24 to adjust the bias of the base electrode 22 will vary the value to which the negative going portion of the input signal is clipped.

Although an N-type or PNP transistor has been illustrated, it is to be understood that a transistor of an opposite conductivity type may also be used, with a consequent reversal of the battery polarities. If a P-type or an NPN transistor is used, the clipping action will be reversed, that is, the clipping level of the negative going portions of the input signal will be determined by the voltage on the collector electrode 14 and the clipping level on the positive going portions will be determined by the voltage applied to the base electrode 22.

A clipping circuit utilizing the present invention has the additional advantage that the gain of the transistor is also available for various mixing and switching operations, since the variable voltage applied to the base electrode 22 may be made automatically variable by any suitable means, as by moving the contact 25 thereby.

A controllable clipper circuit constructed in accordance with the invention provides in a simple circuit a versatile and economical means providing a wide variety of clipping or limiting functions.

What is claimed is:

1. A signal clipping circuit comprising in combination, a signal input terminal and a signal output terminal, means providing a resistive impedance element connected between said signal input and signal output terminals, a transistor having base, emitter and collector electrodes, means connecting the collector-to-emitter circuit of said transistor between said signal output terminal and a point of reference potential for said circuit, means connected for applying a variable energizing potential between said collector and emitter electrodes, and means for applying a variable bias potential to said base electrode.

2. A clipping circuit as defined in claim 1, wherein the means for applying a variable energizing potential between the collector and emitter electrodes is reversible in polarity.

3. A signal clipping circuit comprising in combination, a signal input terminal, a signal output terminal and a common terminal, a resistive element connected between said signal input and signal output terminals, a transistor having base, emitter and collector electrodes, means connecting the collector-to-emitter circuit of said transistor between said signal output terminal and said common terminal, first bias means connected for applying a variable energizing potential between said collector and emitter electrodes, and second bias means connected for applying a variable potential to said base electrode, whereby variations of the clipping levels of a signal applied to said input terminal is effected by variations of said first and second bias means.

4. A signal clipping circuit having controllable clipping levels comprising in combination, a transistor having base, emitter and collector electrodes, a resistive device connected to said collector electrode, means for applying an input signal to said collector electrode through said resistive device, means for deriving an output signal directly from said collector electrode, first voltage means for biasing said collector electrode to conduct through the collector-to-base diode of said transistor at input signal levels in one direction exceeding a first predetermined value, second bias voltage means for biasing said base electrode to provide collector voltage limiting of said transistor at input signal levels in the opposite direction exceeding a second predetermined value, and means for varying the value of said first and second bias voltage means to vary the clipping levels of said signal.

5. A signal clipping circuit having controllable clipping levels comprising in combination, a transistor having base, emitter and collector electrodes, a resistive device connected to said collector electrode, means for applying an input signal to said collector electrode through said resistive device, means for deriving an output signal from said collector electrode, bias voltage means for biasing said collector electrode to conduct at input signal levels in one direction exceeding a first predetermined value, second bias voltage means for biasing said base electrode to provide collector voltage limiting of said transistor at input signal levels in the opposite direction exceeding a second predetermined value, and means for varying the value of said bias voltages to vary said first and second predetermined values and adjust the clipping levels of said signal.

References Cited in the file of this patent

UNITED STATES PATENTS

| | | |
|---|---|---|
| 2,604,496 | Hunter | July 22, 1952 |
| 2,759,052 | MacDonald et al. | Aug. 14, 1956 |

FOREIGN PATENTS

| | | |
|---|---|---|
| 752,412 | Great Britain | July 11, 1956 |